US012571365B1

United States Patent
(12) United States Patent
Marrack et al.

(10) Patent No.: US 12,571,365 B1
(45) Date of Patent: Mar. 10, 2026

(54) INJECTOR CLAMP WITH INTEGRATED FUEL SUPPLY AND RETURN PASSAGES

(71) Applicant: Caterpillar Inc., Peoria, IL (US)

(72) Inventors: Andrew O. Marrack, Peoria Heights, IL (US); Eric Schroeder, Germantown Hills, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 18/827,931

(22) Filed: Sep. 9, 2024

(51) Int. Cl.
*F02M 61/14* (2006.01)

(52) U.S. Cl.
CPC ....... *F02M 61/14* (2013.01); *F02M 2200/855* (2013.01)

(58) Field of Classification Search
CPC .. F02M 61/14; F02M 55/025; F02M 2200/85; F02M 2200/851; F02M 2200/852; F02M 2200/853; F02M 2200/855; F02M 2200/856; F02M 2200/857
USPC .................................................. 123/468–470
See application file for complete search history.

(56) References Cited

U.S. PATENT DOCUMENTS

| | | | | |
|---|---|---|---|---|
| 3,930,483 A * | 1/1976 | Blisko | F02M 61/145 123/456 |
| 4,844,036 A * | 7/1989 | Bassler | F02M 51/005 123/456 |
| 6,237,571 B1 | 5/2001 | Harrison | |
| 6,895,939 B2 | 5/2005 | Gould et al. | |
| 2022/0186696 A1 * | 6/2022 | Guzman Trevino | F02M 61/168 |

FOREIGN PATENT DOCUMENTS

| | | | | |
|---|---|---|---|---|
| AT | 293792 B * | 10/1971 | |
| CN | 102734025 B * | 1/2016 | F02M 63/02 |
| CN | 114635816 A * | 6/2022 | B23P 15/00 |
| DE | 3010328 A * | 9/1981 | |
| EP | 0627553 B1 * | 2/1997 | F02M 39/02 |
| EP | 0922852 A2 | 6/1999 | |
| EP | 1482169 A2 | 12/2004 | |
| EP | 1482169 B1 * | 3/2008 | F02M 55/025 |
| GB | 2310892 A | 9/1997 | |
| JP | 04076264 A * | 3/1992 | |
| WO | WO-0229238 A1 * | 4/2020 | F02M 55/005 |

OTHER PUBLICATIONS

EP0627553 English Translation (Year: 1997).*
Written Opinion and International Search Report for Int'l. Patent Appln. No. PCT/US2025/042159, mailed Dec. 2, 2025 (12 pgs).

* cited by examiner

*Primary Examiner* — George C Jin
*Assistant Examiner* — Teuta B Holbrook
(74) *Attorney, Agent, or Firm* — Xsensus LLC

(57) ABSTRACT

An injector clamp is constructed to retain the position thereof against fuel pressure of a fuel system. The injector clamp includes an outer shell and a chamber interior to the outer shell. An inlet port is formed on the outer shell and in fluid communication with an injector source port formed on the outer shell. An outlet port is formed on the outer shell and in fluid communication with an injector return port formed on the outer shell. A dividing structure is constructed to divide the chamber into a source flow conduit in fluid communication with both the inlet port and the injector source port, and a return flow conduit in fluid communication with both the outlet port and the injector return port.

21 Claims, 5 Drawing Sheets

INJECTOR CLAMP WITH INTEGRATED FUEL SUPPLY AND RETURN PASSAGES

TECHNICAL FIELD

The present disclosure relates to injector clamps. More specifically, the present disclosure is directed to injector clamps that simplify fuel line routing.

BACKGROUND

Injector clamps are devices that counter the high pressure of fuel being delivered to the fuel injector. Typically, fuel is delivered through a system of hoses and the like. Attaching the hoses (and other engine components) may be hindered by the tight working space around the cylinder head.

U.S. Pat. No. 3,930,483 is directed to an apparatus for supplying fuel to a fuel-injected engine. Each of the fuel injectors has its discharge port positioned in the engine cylinder head and a clamp retains the injector in position thereon. The clamp has a first portion that has a passage for receiving the inlet conduit to the fuel injector. Also, this portion of the clamp has inlet and outlet passages in communication with the passage receiving the injector inlet conduit so that fuel supplied to the inlet passage flows into the inlet conduit of the fuel injector and also flows out of the outlet passage. A second portion of the clamp is used for securing the clamp to the engine intake manifold. The fuel injector is located between the first portion of the clamp and the intake manifold. Flexible conduit may be used to connect the outlet passage of one clamp with the inlet passage to another clamp.

SUMMARY

In one aspect of the present inventive concept, an injector clamp is constructed to retain the position thereof against fuel pressure of a fuel system. The injector clamp includes an outer shell and a chamber interior to the outer shell. An inlet port is formed on the outer shell and in fluid communication with an injector source port formed on the outer shell. An outlet port is formed on the outer shell and in fluid communication with an injector return port formed on the outer shell. A dividing structure is constructed to divide the chamber into a source flow conduit in fluid communication with both the inlet port and the injector source port, and a return flow conduit in fluid communication with both the outlet port and the injector return port.

In another aspect of the present inventive concept, a fuel system is constructed to supply fuel to cylinders of an internal combustion engine. Fuel injectors are constructed to deliver fuel to the cylinders and injector clamps retain the fuel injectors against pressure of fuel delivery. Each injector clamp includes an outer shell, an inlet port formed on the outer shell and in fluid communication with an injector source port formed on the outer shell and an outlet port formed on the outer shell and in fluid communication with an injector return port formed on the outer shell. A chamber is interior to the outer shell and a dividing structure constructed to divide the chamber into a source flow conduit in fluid communication with both the inlet port and the injector source port, and a return flow conduit in fluid communication with both the outlet port and the injector return port.

In yet another aspect of the present inventive concept, an injection clamp of an internal combustion engine includes an outer shell, an inlet port formed on the outer shell and in fluid communication with an injector source port formed on the outer shell, and an outlet port formed on the outer shell and in fluid communication with an injector return port formed on the outer shell. A fuel source conduit is formed between the inlet port and the injector source port, and a fuel return conduit is formed between the outlet port and the injector return port.

DESCRIPTION OF EXAMPLE EMBODIMENTS

Figure 1:
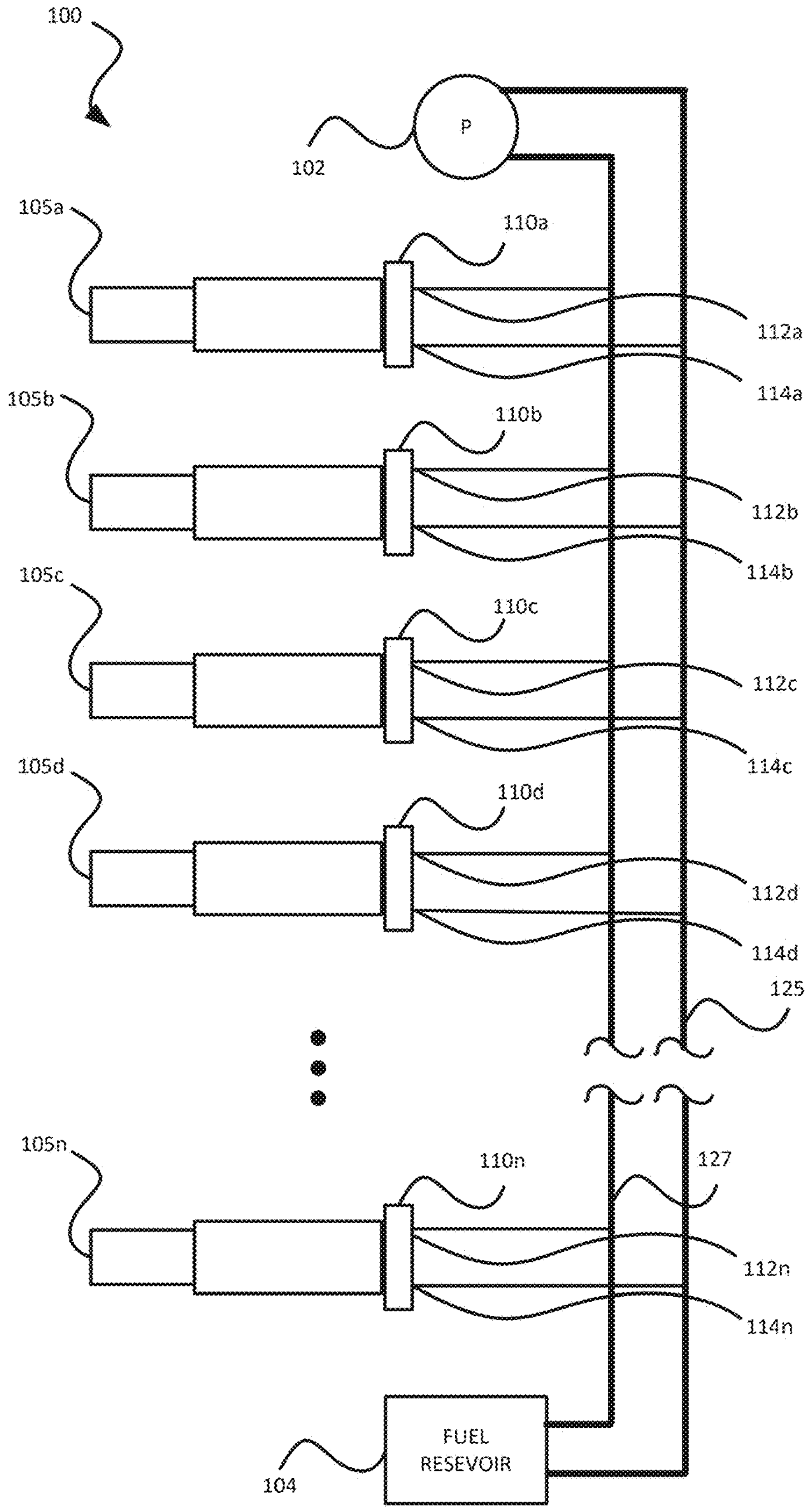
FIG. 1 is a schematic block diagram of a fuel system by which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The techniques described herein are directed to injector clamps having integrated source and return fuel supply conduits. Upon review of this disclosure and appreciation of the concepts disclosed herein, the ordinarily skilled artisan will recognize other injector clamp contexts in which the present inventive concept can be applied. The scope of the present invention is intended to encompass all such alternative implementations.

FIG. 1 is a schematic block diagram of a fuel system 100 for an N-cylinder engine by which the present inventive concept can be embodied. Fuel may be stored in a fuel reservoir 104 and provided under pressure to the engine via a fuel pump 102. Pressurized fuel may be introduced into the engine cylinders through respective fuel injectors 105*a*-105*n*, representatively referred to herein as fuel injector(s) 105. To hold fuel injectors 105 against the pressure of the injected fuel, fuel injectors 105 may be clamped in position by respective injector clamps 110*a*-110*n*, representatively referred to herein as injector clamp(s) 110. As will be described further herein, injector clamps 110 may have passages formed therein to implement respective inlet ports 112*a*-112*n*, representatively referred to herein as inlet port(s) 112 and respective outlet ports 114*a*-114*n*, representatively referred to herein as outlet port(s) 114. As illustrated in the figure, injector clamps 110 may be connected in parallel, with the outlet ports 114 being in fluid communication with a return fuel rail 125 and the inlet ports 112 being in fluid communication with source fuel cell 127.

Figure 2:
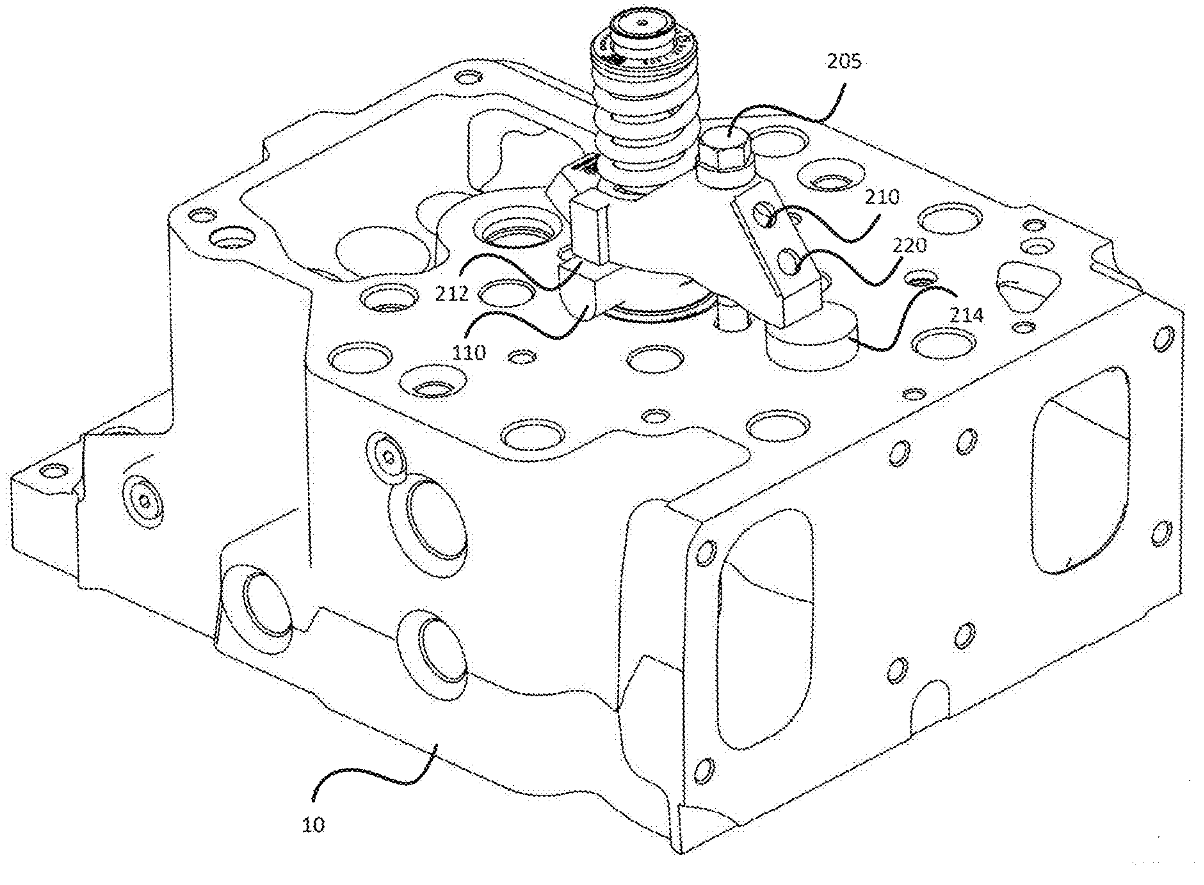
FIG. 2 is an illustration of a cylinder head on which an injector clamp is installed by which the present inventive concept can be embodied.
Figure 4:
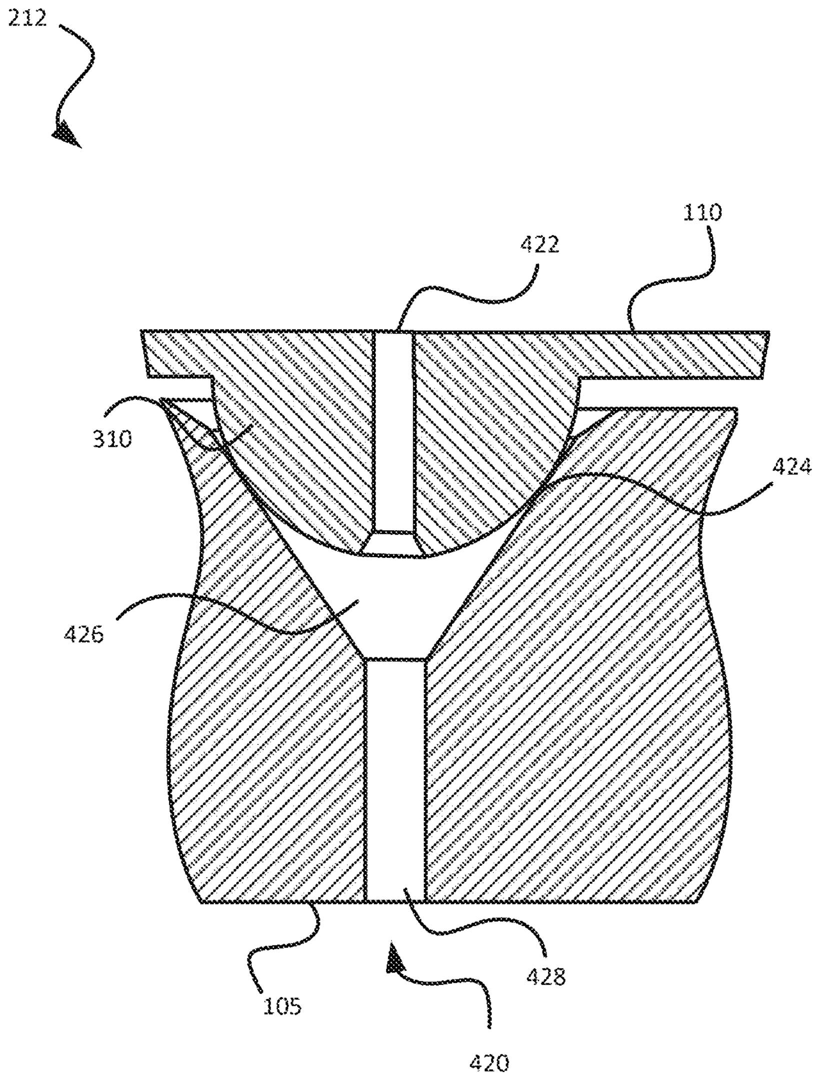
FIG. 4 is a cross-sectional view of a conduit coupling of injector clamp by which the present inventive concept can be embodied.

FIG. 2 is an illustration of a cylinder head 10 on which an exemplary injector clamp 110 is installed. Injector clamp 110 may be mounted on cylinder head 10 through mounting bolt 205. A boss 214 may be formed on cylinder head 10 to engage injector clamp 110 at one end to maintain proper spacing with respect to fuel interface 212 on fuel injector 105. FIG. 4 depicts such a fuel interface 212. Injector clamp 110 may have an inlet port 220 for connection with a source fuel rail 127 of fuel system 100 and an outlet port 210 for connection with a return fuel rail 125 of fuel system 100.

Figure 3:
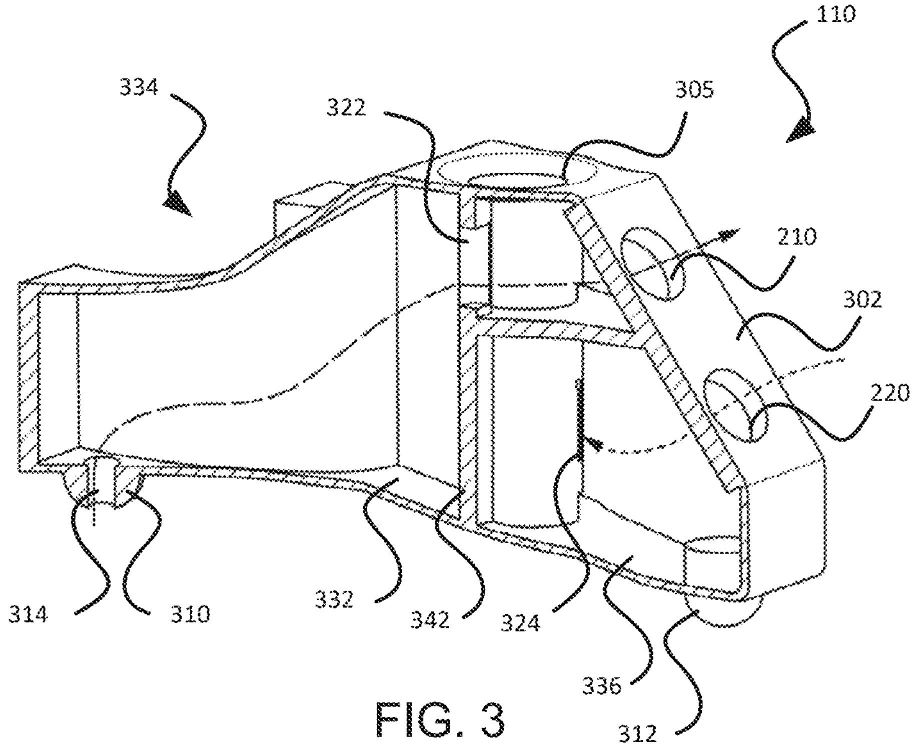
FIG. 3 is a sectional view of an injector clamp by which the present inventive concept can be embodied.

FIG. 3 is a sectional view of an injector clamp 110 by which the present inventive concept can be embodied. Injector clamp 110 may have a bore 305 through which mounting bolt 205 passes to threadedly engage cylinder head 10. The exterior of injector clamp 110 may have formed thereon a set of standoffs, e.g., 310 and 312 that maintain the proper distance to the fuel injector under pressure imparted thereto by mounting bolt 205. It is to be noted that standoff 310 serves as a fuel conduit 314 into a fuel injector 105. Additionally, the exterior of injector clamp 100 may have a shape that accommodates other engine parts, including a fork 334 that may accommodate a valve spring, such that illustrated in FIG. 2.

Injector clamp 110 may have an inclined surface 302 that is constructed to position outlet port 210 and inlet port 220 for connection to external fuel conduits. Such an incline 302 may be constructed to ease the connection process.

The interior of injector clamp 110 may include a conduit 332 for delivering return fuel to fuel system 100 and a similar conduit 336 for delivering source fuel to fuel injector 105. To segregate the source fuel path from the return fuel path, a dividing structure 342 may be formed on the interior of injector clamp 110. The dividing structure may have cutouts 322 and 324 therethrough that allow fuel to flow in the corresponding fuel path. Accordingly, fuel may flow through inlet port 220, through cutout 324, through an inlet standoff (hidden from view), and to the fuel injector 105.

Injector clamp 110 may be fabricated from a metal, such as aluminum or steel, using common machining techniques or 3D printing. The present inventive concept may be implemented using various fabrication techniques without departing from the spirit and intended scope thereof.

FIG. 4 is a cross-sectional view of a fuel interface 212 of injector clamp 110 by which the present inventive concept can be embodied. Such an interface may be implemented for both source fuel path and return fuel path. Hemispherical standoff 310 may be accepted into a conical cavity 426 of fuel injector 105 to form interface 424. It is to be understood that the components illustrated if FIG. 4 are not drawn to scale but are schematically depicted to point out various features that may be implemented in the illustrated embodiments. Additionally, while the term "hemispheric" is used to describe standoff 310, it may only be near hemispherical depending on the desired seal at interface 424. Embodiments of the present inventive concept may seat hemispherical standoff 310 firmly in conical cavity 426 so as to form a continuous fuel path 420 through conduit 422, standoff 310 and into (or out of) fuel injector 105. Sufficient torque applied to mounting bolt 205 may consequently form a sealing surface at interface 424.

Figure 5:
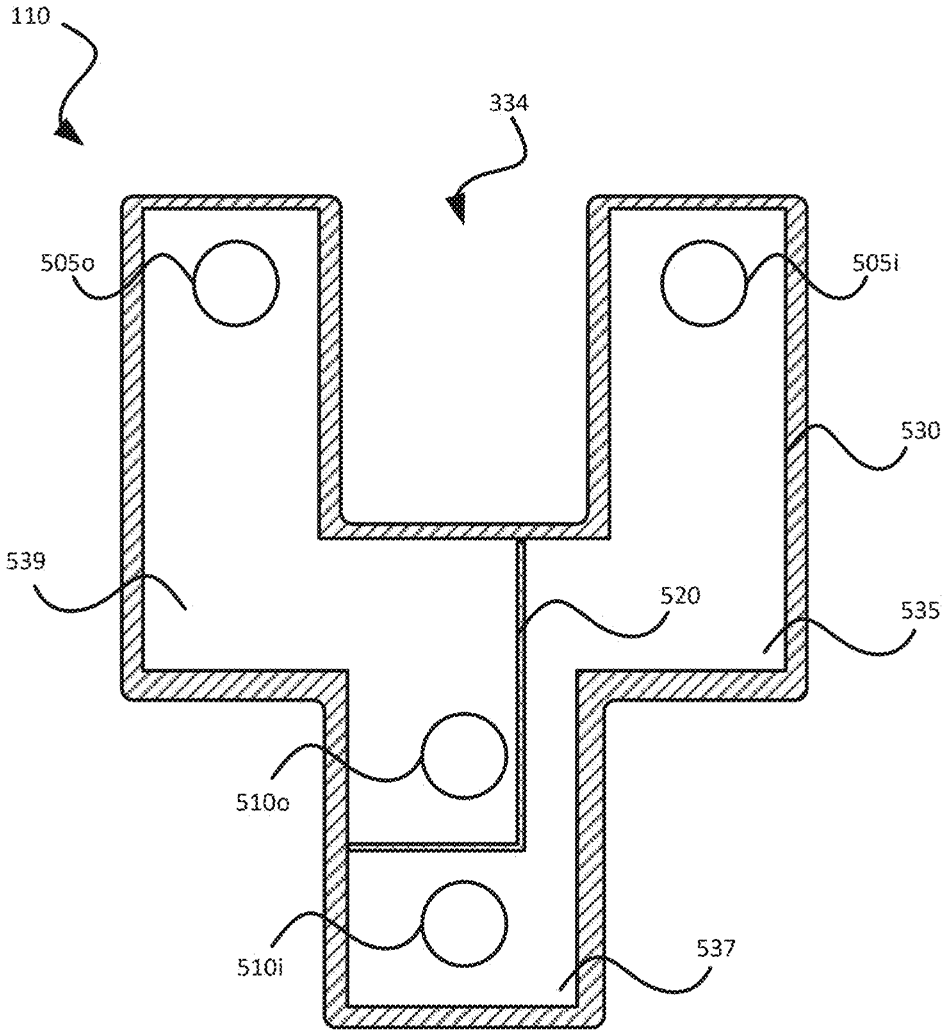
FIG. 5 is a cross-sectional view of an injector clamp by which the present inventive concept can be embodied.

FIG. 5 is a cross-sectional view of an injector clamp 110 by which the present inventive concept can be embodied. Injector clamp 110 may have an outer shell 530 and an interior chamber 535. The interior chamber 535 may be divided into separate chambers to define a source conduit 537 and a return conduit 539.

Injector clamp 110 may include an outlet port 510*o* and an inlet port 510*i* for coupling to fuel system 100. Additionally, injector clamp 110 may include injector source port 510*i* and an injector return port 510*o* for coupling to a corresponding fuel injector 105. Injector source port 510*i* and injector return port 5050 may be in separate protuberances of fork 334.

As illustrated in FIG. 5, injector return port 5050 may be in fluid communication with conduit 539 and consequently in fluid communication with outlet port 510*o*. Similarly, injector source port 505*i* may be in fluid communication with conduit 537 and consequently in fluid communication with inlet port 510*i*. To segregate the source flow from the return flow, a dividing structure 520 may be implemented to define separate conduits 537 and 539.

The overall fluid flow may be defined in injector clamp 110 as accepting fuel an inlet port 505*i*, through conduit 537 and to injector source port 505*i*. Further, the fluid flow continues by accepting fuel from fuel injector 105 at injector return port 5050, through conduit 539 and to fuel system 100 through outlet port 510*o*.

Embodiments of the disclosed subject matter can also be as set forth according to the following parentheticals.

(1). An injector clamp constructed to retain the position thereof against fuel pressure of a fuel system, the injector clamp comprising: an outer shell; an inlet port formed on the outer shell and in fluid communication with an injector source port formed on the outer shell; an outlet port formed on the outer shell and in fluid communication with an injector return port formed on the outer shell; a chamber interior to the outer shell; and a dividing structure constructed to divide the chamber into a source flow conduit in fluid communication with both the inlet port and the injector source port, and a return flow conduit in fluid communication with both the outlet port and the injector return port.

(2). The injector clamp of (1), wherein the injector source port and the injector return port mate with a fuel injector of an engine.

(3). The injector clamp of (2), further comprising standoffs formed on the outer shell, one of the standoffs having an interior passage in fluid communication with the source flow conduit and another one of the standoffs having an interior passage in fluid communication with the return flow conduit.

(4). The injector clamp of (1)-(3), wherein the standoffs are hemispheric.

(5). The injector clamp of (1), further comprising a fork defined by the outer shell.

(6). The injector clamp of (1) or (5), wherein the injector source port and the injector return port are in separate protuberances of the fork.

(7). The injector clamp of (5)-(6), wherein the inlet port and the outlet port are in the same protuberance of the fork.

(8). A fuel system constructed to supply fuel to cylinders of an internal combustion engine, the fuel system comprising: fuel injectors constructed to deliver fuel to the cylinders; injector clamps to retain the fuel injectors against pressure of the fuel delivery, each injector clamp comprising: an outer shell; an inlet port formed on the outer shell and in fluid communication with an injector source port formed on the outer shell; an outlet port formed on the outer shell and in fluid communication with an injector return port formed on the outer shell; a chamber interior to the outer shell; and a dividing structure constructed to divide the chamber into a source flow conduit in fluid communication with both the inlet port and the injector source port, and a return flow conduit in fluid communication with both the outlet port and the injector return port.

(9). The fuel system of (8), wherein the injector source port and the injector return port of the injector clamp mate with a fuel injector of the engine.

(10). The fuel system of (8) or (9), further comprising standoffs formed on the outer shell of the injector clamp, one of the standoffs having an interior passage in fluid communication with the source flow conduit and another one of the standoffs having an interior passage in fluid communication with the return flow conduit.

(11). The fuel system of (8), (9) or (10), wherein the standoffs of the injector clamp are hemispheric.

(12). The fuel system of claim (8), further comprising a fork defined by the outer shell of the injector clamp.

(13). The fuel system of 8 or (12), wherein the injector source port and the injector return port of the injector clamp are in separate protuberances of the fork defined therewith.

(14). The fuel system of (8), or (9)-(13), wherein the inlet port and the outlet port of the injector clamp are in the same protuberance of the fork.

(15). The fuel system of (8) further comprising a bore through which a mounting bolt is accepted, the mounting bolt securing the injector clamp to the engine.

(16). An injection clamp of an internal combustion engine comprising: an outer shell; an inlet port formed on the outer shell and in fluid communication with an injector source port formed on the outer shell; an outlet port formed on the outer shell and in fluid communication with an injector return port formed on the outer shell; a fuel source conduit between the inlet port and the injector source port; and a fuel return conduit between the outlet port and the injector return port.

(17). The injector clamp of (16), wherein the injector source port and the injector return port of the injector clamp mate with a fuel injector of the engine.

(18). The injector clamp of (16) or (17), further comprising standoffs formed on the outer shell of the injector clamp, one of the standoffs having an interior passage in fluid communication with the source flow conduit and another one of the standoffs having an interior passage in fluid communication with the fuel return conduit.

(19). The injector clamp of (16)-(18), wherein the standoffs of the injector clamp are hemispheric.

(20). The injector clamp of (16), further comprising a fork defined by the outer shell of the injector clamp.

INDUSTRIAL APPLICABILITY

Injector clamps are designed to retain a fuel injector seated in a cylinder head against fluid pressure of the delivered fuel. Certain injector clamps take up space in the already tight quarters of the engine compartment making connecting the fuel injector to the fuel system difficult. That is, inlet and outlet ports of the fuel injector, which may be positioned on an outward face of the fuel injector, are connected to respective source and return ports through respective source and return conduits.

This disclosure is directed to an injector clamp that has source and return conduits formed therein. The source and return conduits may be in fluid communication with both the fuel injector and the cylinder head through the source and return conduits formed in the injector clamp. Additionally, connections of the injector clamp may be located thereon to ease the installation thereof. For example, the source and return ports may be positioned on the injector clamp in an outward face of the injector clamp so as to be readily accessible.

It is a design goal across industries to simplify assembly of the object being fabricated. This disclosure describes a manner in which assembly of an engine is eased by making conduit connections occur at an outer face of the injector clamp.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An injector clamp constructed to retain the position thereof against fuel pressure of a fuel system, the injector clamp comprising:

an outer shell;

an inlet port formed on the outer shell and in fluid communication with an injector source port formed on the outer shell;

an outlet port formed on the outer shell and in fluid communication with an injector return port formed on the outer shell;

a chamber interior to the outer shell;

a dividing structure constructed to divide the chamber into a source flow conduit in fluid communication with both the inlet port and the injector source port, and a return flow conduit in fluid communication with both the outlet port and the injector return port; and standoffs formed on the outer shell, one of the standoffs having an interior passage in fluid communication with the source flow conduit and another one of the standoffs having an interior passage in fluid communication with the return flow conduit.

2. The injector clamp of claim 1, wherein the injector source port and the injector return port mate with a fuel injector of an engine.

3. The injector clamp of claim 1, wherein the standoffs are hemispheric.

4. The injector clamp of claim 1, further comprising a fork defined by the outer shell.

5. The injector clamp of claim 4, wherein the injector source port and the injector return port are in separate protuberances of the fork.

6. The injector clamp of claim 5, wherein the inlet port and the outlet port are in the same protuberance of the fork.

7. The injector clamp of claim 1, wherein the outer shell has an inclined surface having both the inlet port and the outlet port facing a same direction.

8. A fuel system constructed to supply fuel to cylinders of an internal combustion engine, the fuel system comprising:

fuel injectors constructed to deliver fuel to the cylinders; and injector clamps to retain the fuel injectors against pressure of the fuel delivery, each injector clamp including:

an outer shell;

an inlet port formed on the outer shell and in fluid communication with an injector source port formed on the outer shell;

an outlet port formed on the outer shell and in fluid communication with an injector return port formed on the outer shell;

a chamber interior to the outer shell; and a dividing structure constructed to divide the chamber into a source flow conduit in fluid communication with both the inlet port and the injector source port, and a return flow conduit in fluid communication with both the outlet port and the injector return port, wherein the outer shell has an inclined surface having both the inlet port and the outlet port facing a same direction, wherein the source flow conduit is in fluid communication with the inlet port and the injector source port via a first opening in the dividing structure, wherein the return flow conduit is in fluid communication with the outlet port and the injector return port via a second opening in the dividing structure, and wherein the source flow conduit and the return flow conduit are fully distinct and segregated from each other by the dividing structure.

9. The fuel system of claim 8, wherein the injector source port and the injector return port of the injector clamp mate with a fuel injector of the engine.

10. The fuel system of claim 9, further comprising standoffs formed on the outer shell of the injector clamp, one of the standoffs having an interior passage in fluid communication with the source flow conduit and another one of the standoffs having an interior passage in fluid communication with the return flow conduit.

11. The fuel system of claim 10, wherein the standoffs of the injector clamp are hemispheric.

12. The fuel system of claim 8, further comprising a fork defined by the outer shell of the injector clamp.

13. The fuel system of claim 12, wherein the injector source port and the injector return port of the injector clamp are in separate protuberances of the fork defined therewith.

14. The fuel system of claim 13, wherein the inlet port and the outlet port of the injector clamp are in the same protuberance of the fork.

15. The fuel system of claim 8 further comprising a bore through which a mounting bolt is accepted, the mounting bolt securing the injector clamp to the engine.

16. An injection clamp of an internal combustion engine comprising:

an outer shell;

an inlet port formed on the outer shell and in fluid communication with an injector source port formed on the outer shell;

an outlet port formed on the outer shell and in fluid communication with an injector return port formed on the outer shell;

a fuel source conduit between the inlet port and the injector source port; and a fuel return conduit between the outlet port and the injector return port; and a dividing wall defining an interior chamber of the outer shell into a source flow conduit in fluid communication with both the inlet port and the injector source port, and a return flow conduit in fluid communication with both the outlet port and the injector return port, wherein the source flow conduit and the return flow conduit are fully distinct and segregated from each other by the dividing wall.

17. The injector clamp of claim 16, wherein the injector source port and the injector return port of the injector clamp are configured to mate with a fuel injector of the engine.

18. The injector clamp of claim 17, further comprising standoffs formed on the outer shell of the injector clamp, one of the standoffs having an interior passage in fluid communication with the source flow conduit and another one of the standoffs having an interior passage in fluid communication with the fuel return conduit.

19. The injector clamp of claim 18, wherein the standoffs of the injector clamp are hemispheric.

20. The injector clamp of claim 16, further comprising a fork defined by the outer shell of the injector clamp.

21. The injector clamp of claim 16, wherein the source flow conduit is in fluid communication with the inlet port and the injector source port via an opening in the dividing wall, wherein the source flow conduit and the return flow conduit are fully distinct and segregated from each other by the dividing wall, and wherein the inlet port and the outlet port face a same direction.

* * * * *